United States Patent [19]

Love

[11] 4,261,105
[45] Apr. 14, 1981

[54] REDUCTION OF VIBRATION FROM MECHANISMS

[76] Inventor: James P. Love, 2 Chestnut Close, Market Bosworth, Leicestershire CV12 OLR, England

[21] Appl. No.: 936,615

[22] Filed: Aug. 24, 1978

[30] Foreign Application Priority Data

Aug. 30, 1977 [GB] United Kingdom ............... 36165/77

[51] Int. Cl.³ .......................... B27B 17/02; B60K 5/04
[52] U.S. Cl. .................................. 30/383; 123/198 E; 180/227; 56/295
[58] Field of Search ....................... 123/198 E, 195 C; 180/33 A, 227; 30/381, 382, 383, 210; 56/295

[56] References Cited

U.S. PATENT DOCUMENTS

| 3,224,473 | 12/1965 | Dobbertin | 30/383 |
| 3,722,612 | 3/1973 | Issigonis | 180/33 A |
| 4,010,544 | 3/1977 | Siman | 30/381 |
| 4,019,594 | 4/1977 | Koyama | 180/33 A |

FOREIGN PATENT DOCUMENTS

| 564478 | 2/1958 | Belgium . | |
| 96405 | 10/1922 | Switzerland | 180/33 A |
| 222750 | 10/1924 | United Kingdom . | |
| 642893 | 9/1950 | United Kingdom . | |
| 419377 | 10/1974 | U.S.S.R. | 30/383 |
| 564959 | 8/1977 | U.S.S.R. | 30/381 |

Primary Examiner—Jimmy C. Peters

[57] ABSTRACT

The invention is concerned with the reduction of the vibration transmitted from a mechanism having at least one element rotating at a fundamental frequency and one or more cyclically displaceable further elements connected to said rotating element, and in which the displacements of said further elements produce an aggregate cyclic linear exciting force of fundamental frequency and harmonics thereof acting on the same line. To prevent transmission of vibrations produced by said exciting force from the mechanism to its support means, the mechanism is constrained to prevent all degrees of freedom of movement relative to the support means except for movement under the influence of said linear exciting force which is thereby isolated from the support means. The mechanism also has balancing means integral with or attached to said rotating element for balancing any rotating force produced at said fundamental frequency. Low rate resilient suspension means and damping means may also be connected between the mechanism and the support means.

14 Claims, 20 Drawing Figures

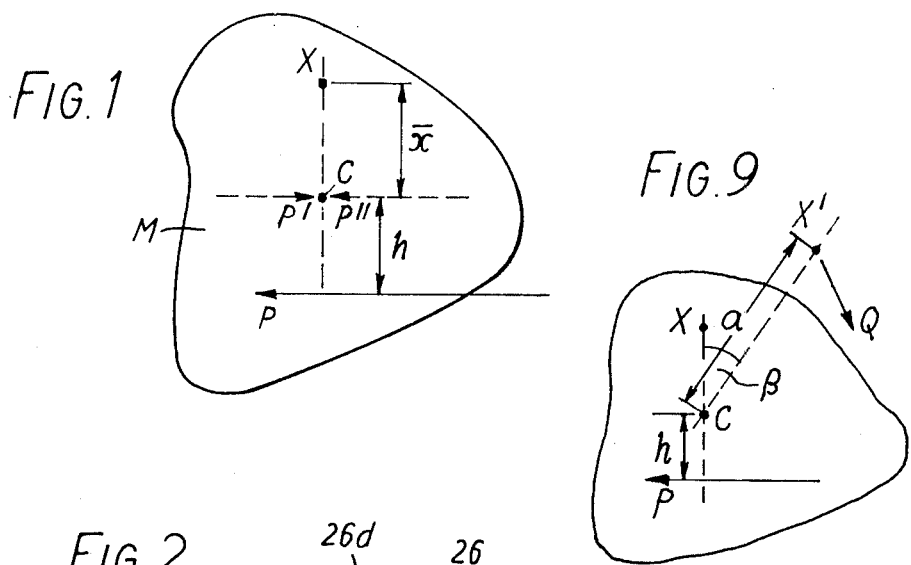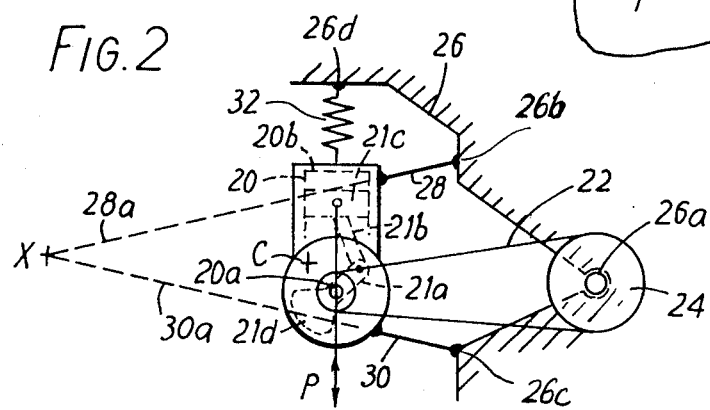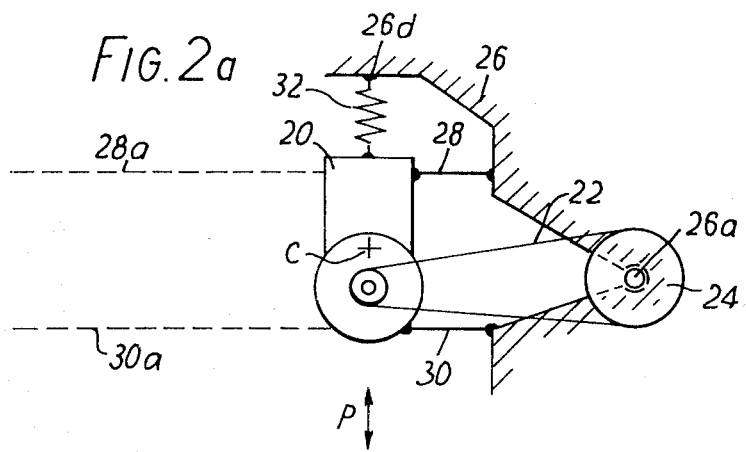

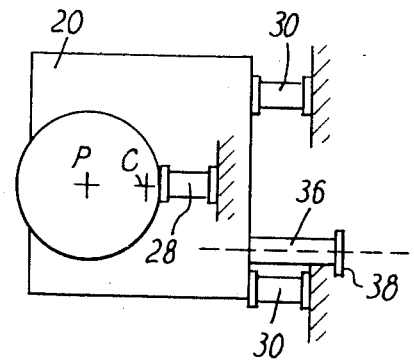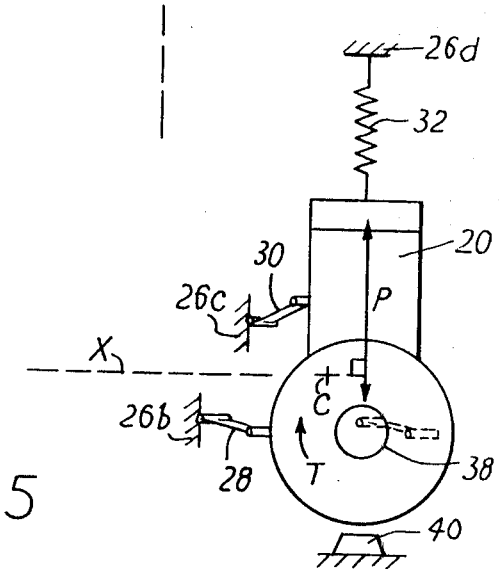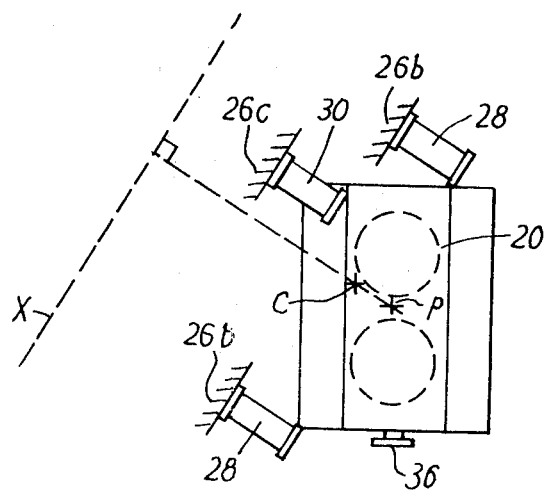

REDUCTION OF VIBRATION FROM MECHANISMS

BACKGROUND OF THE INVENTION

This invention relates to apparatus that comprises support or carrier means to which is attached a mechanism having at least one element rotating at a fundamental or first-order frequency and one or more cyclically displaceable further elements directly or indirectly mechanically connected to said at least one element, the displacement of said cyclically displaceable element or elements producing a linear cyclic force of fundamental frequency and harmonics thereof acting on the same line and in which mechanism are rotary balancing means integral with or attached to said rotating element or elements. The invention is concerned with a method and means by which the transmission of the vibrations produced by such cyclic exciting forces to the support means can be reduced.

For convenience in the following description, said linear cyclic force of fundamental frequency together with any harmonics thereof acting along the same line will be referred to hereinafter as the "ACLEF" (being an abbreviation of "aggregate cyclic linear exciting force").

Many forms of apparatus are known that generate out-of-balance forces of this nature. In a very common example, the mechanism comprises a rotary crank, connecting rod and slider—the slider being a reciprocating piston—as in internal combustion engines, and fluid motors and compressors. In its simplest form with a single crank, connecting rod and piston, there is no difficulty in balancing the rotary forces generated by the movement of the crank, but to balance completely the reciprocatory linear cyclic force of the slider or piston involves either a multiplicity of sliders (e.g. six pistons in an in-line engine), or an integral mirror image construction (e.g. the Ariel "Square four" motor cycle engine), or a non-power contributing balancer piston, or one or more contra-rotating masses, or other additional moving elements. The co-linearity of the harmonics of out-of-balance reciprocating forces with the fundamental or first-order out-of-balance reciprocating force in crank/connecting rod/slider mechanisms is fully analysed in "A Treatise on Engine Balance using Exponentials" by P. Cormac, Chapter III, pages 14 and 15 (Chapman & Hall Ltd., London, 1923).

The line of action of the ACLEF may pass through the centre of gravity of the mechanism of which the cyclically displaceable elements are a part but more usually said line of action will be spaced from the centre of gravity of the complete mechanism that these elements are a part of, and there will be other elements, such as induction and exhaust means, a drive output transmission and the like, which cannot normally be disposed symmetrically.

It is generally accepted that the optimum result is obtained in practice by a compromise between balancing the rotary forces and balancing the linear cyclic forces. (E.g., see "Automobile Engineer's Reference Book" edited by Molloy and Lanchester, George Newnes Ltd., London 1956—Section 3 "Engines" pages 162-3 where, with reference to single-cylinder engines, it is stated that it is usual to balance the whole of the rotating weight and one-half of the reciprocating weight as this gives the best compromise: similarly, "Diesel Engines Principles and Practice" —George Newnes Ltd., London 1955, Section 13, pages 15–16 gives directions to a similar compromise in respect of single cylinder engines).

Having employed such a compromise for dealing in part with the fundamental order of the ACLEF by over-balancing the rotating masses, the result is an out-of-balance force of magnitude not less than half that of the fundamental order of the ACLEF and current practice is then to mount the mechanism on resilient means. A great variety of such resilient means have been devised and many are mentioned in "Suspension of Internal Combustion Engines" by M. Horovitz (Proc.I.-Mech.E.(London) Automobile Division, No. 1, 1957-58, pages 17–51). There is no reference to the fundamental (or primary) out of balance except that in four-cylinder in-line engines it is generally small enough to be disregarded and the teaching is to minimise out-of-balance forces.

With regard to the use of resilient mounting means for piston engines, there are also various forms of mounting known for the purpose of isolating chassis suspension vibrations from the engine, as in the example of UK Pat. No. 1,200,191. These rely on mounting the engine so that it can pivot about an axis that is transverse to the crankshaft axis and that is some distance from the output end of the crankshaft. The arrangement is concerned with the problem of low frequency vibrations generated, for example, by movement of the vehicle over uneven ground and while it may effectively isolate such vibrations from the engine, it cannot be expected to have a substantial effect in preventing the transmission of engine vibration to the chassis.

There are many other instances in which the operation of a mechanism gives rise to an ACLEF. As further examples, applicances such as chain-saws and hedge-cutters can generate substantial ACLEFs in their operation.

SUMMARY OF THE INVENTION

According to the present invention, there is provided in apparatus comprising support or carrier means to which is attached a mechanism having at least one element arranged to rotate at a fundamental or first-order frequency and one or more cyclically displaceable further elements directlyy or indirectly mechanically connected to said at least one element, the displacement of said cylically displaceable element or elements producing a linear cyclic force of fundamental frequency and harmonics thereof acting on the same line and in which mechanism comprises rotary balancing means integral with or attached to said rotatable element or elements, means attaching said mechanism to the support or carrier means in a manner reducing the transmission of said forces to said support means, said balancing means being arranged to balance at least the major part of any rotating force of fundamental frequency produced by said at least one rotatable element, and the attachment means comprising rigid constraining elements that prevent all degrees of freedom of movement of the mechanism relative to said support means except for movement of the mechanism under the sole influence of the ACLEF.

In the application of the invention to apparatus comprising crank members, such as the reciprocating single- or twin-cylinder engines and motors referred to above, for best effect it is arranged that fundamental or first order rotary out-of-balance forces are substantially completely counterbalanced and no attempt is made to reduce the magnitude of the first order reciprocating out-of-balance force by over-counterbalancing the first order rotary out-of-balance force, even if the result is to increase the magnitude of the linear out-of-balance forces exciting vibrations. This step is directly opposed to the design procedure already mentioned for single- or twin-cylinder in-line engines where conventional practice requires the rotary cyclic exciting forces to be over-compensated in order to give a lesser aggregate cyclic exciting force, and as a result there is also always an aggregate contra-rotary exciting force although it is less than the uncompensated force. Employing the present invention to its best effect, the rotary forces are completely balanced quite independently of the ACLEF since now the support means can be mainly or wholly isolated from this linear force.

In practice the mechanism cannot ordinarily be allowed unlimited freedom of movement in the one degree permitted by the attachment means. Unless the disposition of the mechanism relative to the support means is such that gravity urges the mechanism to a suitable median position, it will then be necessary to establish the median position by elastic means between the mechanism and the support means. The stiffness of the elastic means is preferably less than that which could sustain a natural frequency of the mechanism as a whole relative to the support means below a minimum frequency of the lowest order of the ACLEF within the normal range of operation of the mechanism.

BRIEF DESCRIPTION OF THE DRAWINGS

The invention will be described in more detail by way of example by reference to the accompanying drawings, in which:

FIG. 1 is a schematic diagram of a dynamic system illustrating the theoretical basis one form of the invention, FIG. 2 shows in diagrammatic form one embodiment of apparatus according to the invention, FIG. 2a is a modification of the embodiment in FIG. 2, FIG. 3 is a diagrammatic plan view of another embodiment of the invention, FIGS. 4 and 5 are end and plan views of a further embodiment of the invention in diagrammatic form, FIG. 9 is a schematic diagram of a dynamic system similar to that in FIG. 1 by way of further explanation of the invention.

DESCRIPTION OF THE PREFERRED EMBODIMENTS

Figure 6:
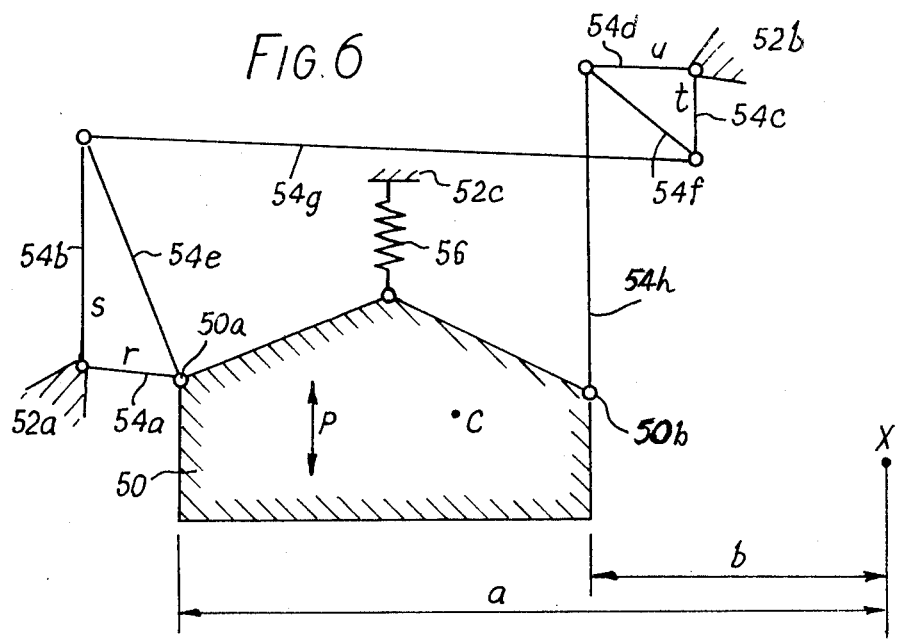
FIGS. 6 and 7 are diagrammatic illustrations of two further embodiments of the invention.

FIG. 1 illustrates a dynamic system in which a mass M, here regarded as being freely suspended in space without gravitational force acting on it, has a centre of mass C. An impulse P acts on the mass at a radial distance h from C. As a result the mass swings about some point X a distance $\bar{x}$ from C along an extension of the same radius. For the purpose of analysis, FIG. 1 shows also equal and opposite impulses P' and P'' both of the same magnitude as P and acting through the centre of mass parallel to P. (Since P' and P'' are self-cancelling, they do not have any resultant action and therefore do not alter the dynamic system.) The impulses P and P' constitute a couple or moment Ph, whence $$Ph - I\alpha = 0 \tag{1}$$

where I is the rotational moment of inertia of the mass about C and $\alpha$ is the angular velocity about C. The impulse P'' acting at the centre of mass will produce a linear displacement, whence $$P - Mv = 0 \tag{2}$$

where v is the translational velocity at the centre of mass C.

(1) may be written as $$Ph\bar{x} - I\alpha\bar{x} = 0$$

$$\alpha\bar{x} = Ph\bar{x}/I \tag{3}$$

but $\alpha x$ is the translational velocity v so that from (2) and (3)

$$Ph\bar{x}/I = v = P/M$$

$$h\bar{x}/I = 1/M$$

$$\bar{x} = I/Mh$$

Thus, the position of the centre of rotation X is dependent solely upon I, M and h. This indicates that a translational impulse applied to any mass at a distance (h) from the centre of mass will cause a rotation about a centre that is defined by that distance and the characteristics of the mass itself, and that is independent of the magnitude of the force.

If P represents a linear cyclic force, its effect will therefore be to excite the mass to oscillate about the point X and this point is referred to in the present specification as the "nodal axis".

If it is imagined, therefore, the mass is a mechanism with one or more displaceable elements that, by their movement, generate a linear cyclic force, by mounting the mechanism on a support or carrier means so that it is constrained to be able only to pivot about the nodal axis X, none of that force will be transmitted to the support means. In practice there may be other considerations which do not allow complete isolation of this exciting or out-of-balance force from the support means, because it is impractical to arrange a pivot axis coincident with the nodal axis or because a single pivot connection is insufficient to determine the location of the mechanism. Nevertheless, as will be described in the following examples, it is still possible to reduce substantially, if not indeed almost completely, the transmission of said cyclic force to said support means by so mounting the mechanism that it is able to pivot about an axis at or in the region of said nodal axis.

FIG. 2 illustrates an embodiment of the dynamic system of FIG. 1 as a reciprocating piston engine 20 which may have a single cylinder, or a two cylinder in line configuration. Shown in schematic outline is crank 21a rotating on crankshaft axis 20a, connecting rod 21b and piston or slider 21c reciprocating in cylinder 20b, as well as a balancing mass 21d rotating with the crank. These parts may be generally conventional, except that as already indicated any balancing mass is arranged to balance substantially all the out-of-balance rotating force of the fundamental or first order frequency represented by the frequency of rotation of the crank. Similar arrangements apply in the other embodiments of the invention to be described below and further illustration is therefore not necessary, it being understood that the balancing means may be of any conventional form provided it is arranged to fulfil the function now required of it.

The engine 20 has an output drive chain 22 to drive sprocket 24 having a mounting point 26a on support or carrier means 26. A pair of pivot links 28, 30 extending from further mounting points 26b, 26c connect the engine to the mounting 26. Both ends of the links are pivoted on axes perpendicular to the plane of the drawing, so that all movements out of the driving plane are prevented and the engine is constrained effectively to a single degree of freedom, pivoting about the nodal axis. The weight of the engine is supported through the links and a tension spring 32 between it and mounting point 26d on the support means. The spring preferably has a low rate (force/displacement characteristic) or even a zero rate. If this condition is observed, the forces produced in the spring by oscillation of the engine about the nodal axis (due to the aggregate cyclic linear exciting force or ACLEF indicated by P and composed of harmonics of a common fundamental frequency generated by the engine moving parts) will be small. In other words, the linear vibratory forces transmitted to the support means will be small.

Longitudinal axes 28a, 30a of the links intersect at the nodal axis X, the position of which will be determined by the mass of the engine, its moment of inertia about the centre of mass, and the distance between the centre of mass and the line of action of the ACLEF P. Although the links will pivot away from their illustrated positions as the engine oscillates under the action of the force P, the amplitude of oscillation will be small, because the equivalent reciprocating mass of the cyclically displaceable elements is considerably less than the remainder of the engine. The centre of oscillation will therefore remain near to the nodal axis, even though it is continually varying.

In the particular configuration shown, both links are put in compression by the forces generated in running the engine, but one or both may be disposed on the opposite side of the engine, while still being located on axial lines radiating from the nodal axis, and will then be in tension.

FIG. 2a shows an embodiment similar in many respects to that in FIG. 2, with corresponding parts indicated by the same reference numbers, but now the ACLEF P passes through the centre of mass C. Consequently it tends to generate a linear reciprocation: i.e. the nodal axis is at infinity. The links 28, 30 are therefore now arranged parallel to each other and substantially at right-angles to the ACLEF. With the relatively small amplitude of oscillation experienced this effectively gives the engine a single linear freedom of movement.

If, instead of a chain, the drive from the engine is transmitted through an output shaft and gearing, in the illustrated configuration one of the links would be in tension and the other in compression, depending upon the direction of rotation of the shaft. FIG. 3 illustrates in plan view a shaft drive arrangement with a single cylinder engine constrained to be able only to pivot about the nodel axis, as already described, by an upper link 28 and a parallel pair of lower links 30. The axis of the output shaft 36 projecting from the engine crankcase is perpendicular to the nodal axis and is provided with a coupling 38, e.g. a universal coupling, for a shaft (not shown) separately supported by the support means that are here indicated only by the pivot mountings of the pivot links.

The examples given so far have assumed that the centre of mass and the ACLEF lie in a common plane perpendicular to the axis of rotation of the engine, but in the more general case this common plane will be oblique to the axis of rotation. This condition can be dealt with in the manner shown in FIGS. 4 and 5, which illustrate a shaft drive twin-cylinder in-line engine, parts corresponding to those already described being indicated by the same reference numbers. Since the nodal axis is perpendicular to said common plane it will be oblique to the engine crankshaft axis and the pivot axis of the links 30, 28 will be correspondingly obliquely disposed. The relative obliquity between the engine output shaft and the nodal axis will not affect the isolation of the ACLEF from the support means. If other circumstances permit, however, it is preferred to arrange that the shaft axis is in a plane perpendicular to the nodal axis: changes of the torque load on the shaft, whether due to a power output from or input to the mechanism, do not then cause changes in the deflection of the supporting resilient means. For the same reason, in a chain drive it is preferred that the axis of the tensioned length of the chain intersects the nodal axis.

FIG. 4 also shows a resilient buffer stop 40 in case of excessive movement of the engine through the action of the ACLEF. As will be described further below, this overtravel device is required mainly during starting and stopping of the engine and will normally be inoperative.

FIG. 6 illustrates another pivot linkage mounting a mechanism 50 on elements 52a, 52b of a support means (not shown). In this linkage the relative lengths of links 54a, 54b, 54c, 54d (these lengths being designated r, s, t, u respectively) proportion the relative movements of attachment points 50a, 50b of the mechanism about the nodal axis X. The links 54a, 54b form a triangular frame with link 54e, and a link 54f similarly forms a triangular frame with links 54c, 54d, and each said frame thus moves as a rigid member. The two triangular frames are interconnected by a further link 54g. The mechanism attachment point 50a is at the junction between links 54a, 54e and the attachment point 50b is at one end of another link 54h connected to the junction between the links 54d, 54f. For pivotal movements of the mechanism 50 the ratio of the displacement of 50a to 50b is required to be equal to the ratio a:b. This is achieved by positioning the attachment points 50a, 50b and selecting the indicated lengths r, s, t, u of the links so that $r/s \cdot t/u = a/b$ The drawing also shows a suspension spring 56 between the mechanism and a further support means attachment point 52c.

Figure 7:
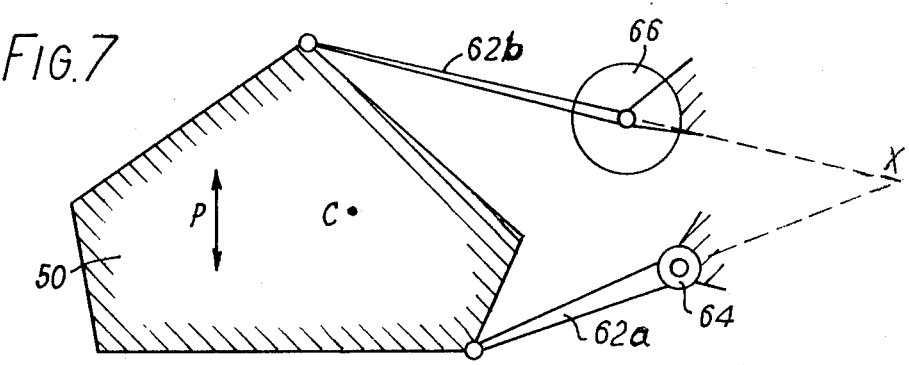

FIG. 7 illustrates an advantageous embodiment of the invention in which the mechanism 50 is connected to its support means, using two links 62a, 62b that incorporate resilient suspension means and damping means in their connections. Thus, link 62a has one of its pivot connections 64 comprising a torsion bar and the other link incorporates a friction disc damper 66. Analogously to the examples shown in FIGS. 2 to 5, the longitudinal axes of the links intersect at or adjacent the nodal axis of the mechanism.

Figure 8:
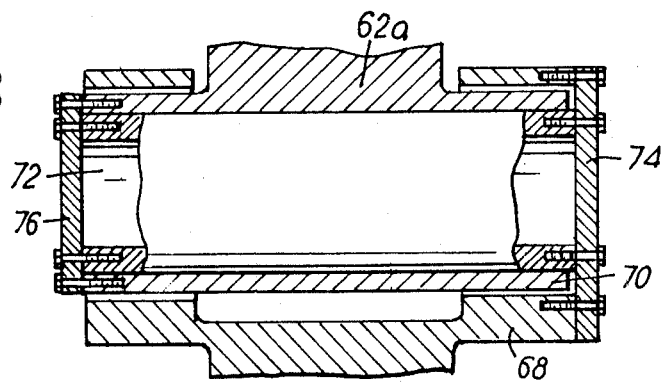
FIG. 8 illustrates a detail of the apparatus in FIG. 7.

The torsion bar connection is shown in more detail in FIG. 8. The support means comprises a tubular socket 68 in which a terminal sleeve 70 at the end of the link 62a is rotatably mounted so as to provide the pivoting freedom of a pin joint. Within the sleeve a resilient torsion tube 72 is rotatable. At one end of the tube a first plate 74 secures it to the socket 68 and at the other end a second plate 76 secures it to the sleeve 70. Thus pivoting of the link produces a torsional stress in the tube 72 which acts a spring. The damper 66 is of a form that acts substantially independently of its rate and magnitude of displacement as it is intended only to damp excessively large oscillations, as will be further described below.

It is of course possible for more than one pivot connection between a mechanism and its support means to be provided with a torsion bar, and these can be at either or both ends of a link. Similarly, it is possible in all embodiments to employ any desired number of damper elements and it will be clear that the or each damper element may be incorporated in a torsion bar. It should also be understood that although the foregoing examples illustrate pivot linkages as attachment means between the mechanism and its support means, any kinematically equivalent form of constraint can be used —e.g. slide guides.

Although the description has so far assumed the ACLEF to be made up of harmonics of a common fundamental frequency, it should be understood that the vibration isolation means described will be equally effective with different frequency components having a common line of action, and also with common frequency components having different lines of action but being in phase with each other. In the case of a reciprocating piston engine or motor that also has reciprocating valve gear the valve push rods, for example, will move on axes close to the cylinder axes and the linear out-of-balance forces generated by such auxiliary elements of the mechanism may be isolated together with the main linear out-of-balance forces.

As already indicated, there may be reasons for not mounting a mechanism to pivot about the nodal axis itself. Because some degree of isolation of the vibrations from the support means is possible in these circumstances, it is within the scope of the invention to select a pivot axis that is only adjacent to the nodal axis. It is considered that a very substantial useful effect may be obtained if at least 50% of the aggregate linear cyclic exciting force is isolated from the support means, but preferably isolation of at least 70% of said force should be aimed for and it is certainly possible in most practical cases to isolate 90% or more of said force.

FIG. 9 illustrates a dynamic system similar to that of FIG. 1 but with the mass constrained to move about an axis X′ other than the nodal axis when the impulse P is applied. Because the axis X′ is not the nodal axis application of the impulse P causes the transmission of some impulse Q, the ratio Q/P then representing the proportional transmission of the impulse P to the means supporting the mass for its rotation about the axis X′. Q/P will be termed e, the value e=0 corresponding to complete isolation of the impulse P from said supporting means. It is possible to show that e is related to the position of X′ in the following formula:

$$(I \cos \beta - Mha) - (e^2 - \sin^2\beta)^{\frac{1}{2}}(I + Ma^2) = 0$$

where $\beta$ is the angle between a line from the centre of mass C to the axis X′ and a perpendicular through C to the line of action of the impulse P, and a is the distance between C and X′. By choice of a particular degree of isolation, the formula defines, in terms of a and $\beta$ the boundary of an area around the nodal axis for obtaining at least that specified degree of isolation. In the particular case of X′ being coincident with the nodal axis X, $\beta=0$, e=0, and a=$\bar{x}$ to give the result that $\bar{x}=I/(Mh)$.

In most instances, because of the small amplitude of oscillation in normal operation it is in fact possible to obtain almost complete isolation without pivoting exactly about the nodal axis. For example, if the nodal axis is a very large distance from the mechanism it will normally be impractical to employ very long links, but even with the nodal axis at a distance many times more than the maximum desired length of the links, it is possible to obtain isolation of all but 10% of the applied impulses of the lengths of the links are at least ten times the half-amplitude of motion of the mechanism relative to the support means.

Figure 10:
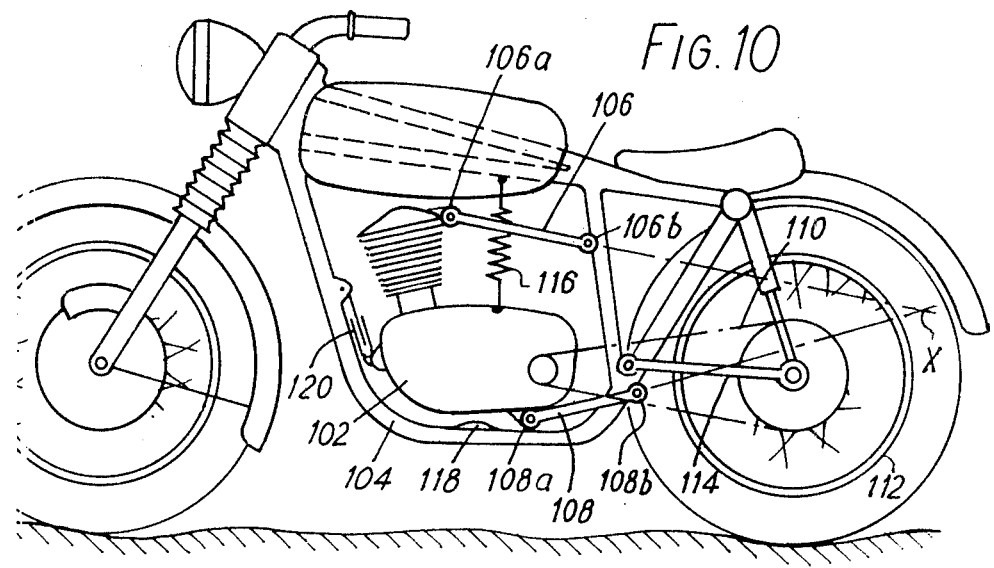
FIGS. 10 and 11 illustrate the application of the invention to a piston-engined motorcycle.

As a more specific example of the use of the invention, FIG. 10 illustrates a motor cycle in which a single-cylinder engine and gearbox unit 102 that may be of generally conventional form, is mounted on the vehicle main frame 104 through pivot links 106, 108 that have pivot axes 106a, 106b, 108a, 108b, perpendicular to the plane of the drawing. The links have longitudinal axes that intersect at the nodal axis x. The disposition of the links means they are put in compression by the tension in the chain drive 110 to rear wheel 112 mounted on radius arm 114 in conventional manner, and the links constrain the unit 102 so that it can only move pivotally about X. There is a suspension spring 116 between the engine unit and the vehicle frame 104 that normally supports the unit clear of a bottom buffer 118. A piston damper 120 shown connected between the unit and the cycle frame is a friction damper, like the disc damper of FIG. 7, and has a damping effect substantially independent of its displacement or velocity.

It is of course necessary to ensure that the effective stiffness of the resilient suspension should be less than that which would sustain a natural frequency of oscillation of the mechanism relative to the support means equal to the minimum fundamental frequency of the ACLEF within the range of operation of the mechanism. In general when the invention is employed with reciprocating piston engines and motors it will be practical to arrange that this frequency is considerably lower than the fundamental frequency of the ACLEF. During start-up the mechanism will pass through a transient resonant state and the damper will then be required to limit momentarily the oscillation of the mechanism. If needed, the buffer 118 is able to act as a resilient overtravel stop supplementing the action of the damper. It may be preferred to adjust or disengage the damper, e.g. manually by a screw-threaded release member, once normal operating speeds have been reached, but in the case of a vehicle or other mobile apparatus particularly the damping means may remain operative and serve a useful purpose in limiting the effects of any significant transient external disturbances, such as may occur when travelling over an uneven surface.

Preferably in this and other embodiments of the invention any over-travel buffers, such as the buffer 118, are resiliently deformable with a non-linear elastic characteristic, so as to not sustain any natural frequency of oscillation of the mechanism. It is also preferable for the buffers to have substantial hysterisis characteristics: i.e. when deflected to develop a restoring force significantly less than the force required to produce that deflection, e.g. by the use of leaf springs with friction between the individual leaves.

As already explained, the rotary out-of-balance forces that the mechanism, i.e. the unit 102, generates will preferably be completely balanced when the mechanism is running. The ACLEF P, acting a spacing from the centre of Mass C of the mechanism, will cause the mechanism to oscillate about the nodal axis. The masses generating this force form a relatively small part of the total mass of the mechanism so that the amplitude of oscillation in normal running conditions will be very small. For example, if the crank and piston in this single cylinder engine have 5% of the mass of the unit and the piston stroke is 10 cm, the opposite movement of the unit will be 0.5 cm. Because of the low rate of the spring and the characteristic of the damper only a negligible portion of the force P will be transmitted to the frame through these components so that it is substantially isolated from the vibration of the mechanism.

It should also be noted that the low amplitude of oscillation allows that actual axis of pivoting to be offset from the exact nodal axis to some extent without unduly affecting the efficiency with which the vibration induced by the ACLEF is isolated from the support frame. In cases in which for structural or other reasons it is not convenient to pivot the oscillatory mechanism at the nodal axis it is thus possible still to obtain a useful advantage if a pivot axis is provided only approximately in the region of the nodal axis.

A further preferred feature illustrated in FIG. 10 is the arrangement of the engine and its drive so that the tensioned length of the drive chain 110 through which the engine torque is transmitted is itself on a line passing through the nodal axis X. Although not important for relatively small forces such as are generated through the suspension spring and damper, in general it will often be desirable that the line of any force transmitted, whether to or from the mechanism mounted in the support means, should lie in a plane that also contains the nodal axis. The effect of not observing this condition is that the mean position of the mechanism will change in dependence upon the magnitude of the transmitted force, but that may be tolerated if the mechanism still has space to oscillate freely under the action of the ACLEF.

There is a particular advantage in the arrangement of the engine drive chain as in the example of FIG. 10, because the tensioned chain will not be subjected to any additional stress from the oscillation of the mechanism about the nodal axis.

Figure 11:
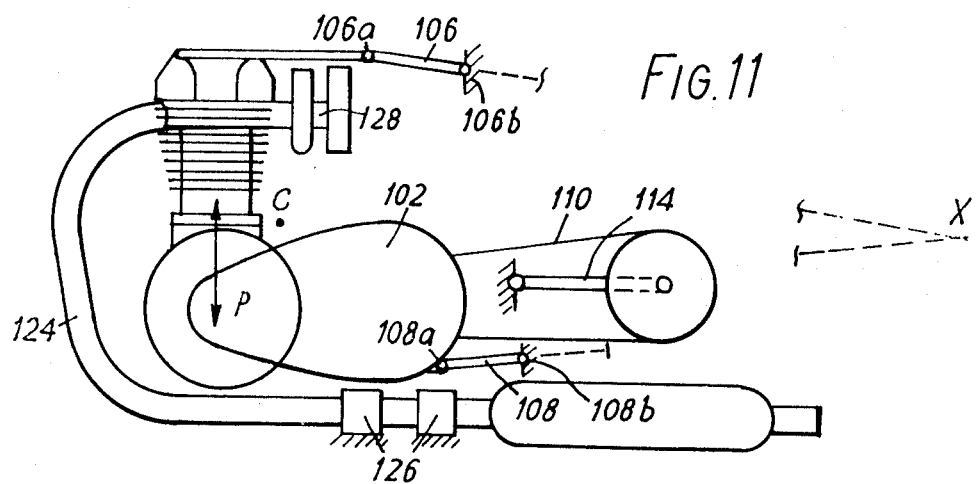

FIG. 11 illustrates some of the details of a further example of an air-cooled piston engine with chain drive in an apparatus according to the invention, e.g. a motor-cycle, and parts corresponding to those already described in FIG. 10 are indicated by the same reference numbers. For convenience the connection 106a is on a steady aim fixed to the cylinder head of the engine unit. Exhaust pipe 124 is secured by brackets 126 to the main frame and in this instance acts as a low-rate suspension spring in place of, or supplementing, the spring 116. It is possible to employ air induction pipe 128 of the engine in a similar manner.

Figure 12:
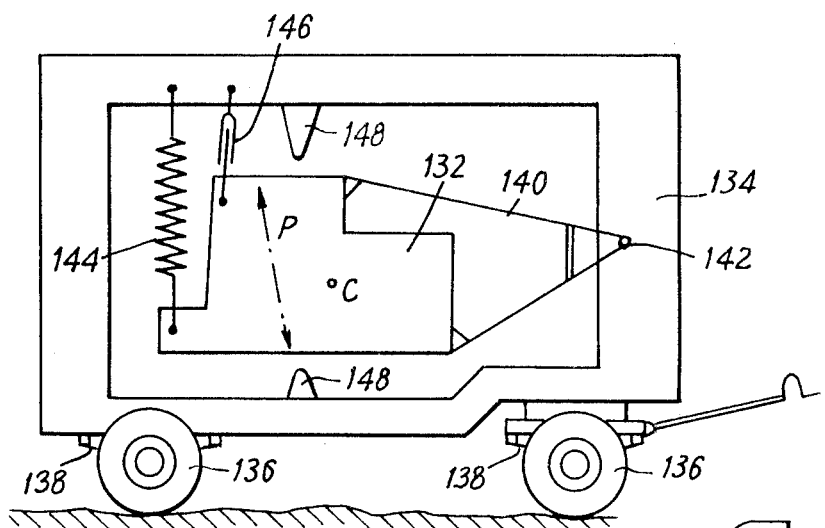
FIG. 12 is an illustration of a mobile air compressor embodying the invention.

FIG. 12 illustrates another apparatus according to the invention in which a crank-driven mechanism 132 for example a two-cylinder in-line air compressor, is mounted in a frame 134 provided with road wheels 136 on a spring suspension 138. The mechanism is connected by a mounting structure 140 to a pivot 142 on the frame at or near the nodal axis X so that as a unit it is only capable of movement about that pivot. It will be understood that the structure 140 is the schematic equivalent of any of the attachment arrangements already described. In order to support the weight of the mechanism there is a low-rate suspension spring 144 between the mechanism and the support frame.

A friction damper 146 is also connected between the mechanism and the frame, and as in the previous examples is preferably of the kind that generates a force not dependent on magnitude or velocity of displacement. Resilient overtravel buffers 148 are also provided between the mechanism and the frame.

Figure 13:
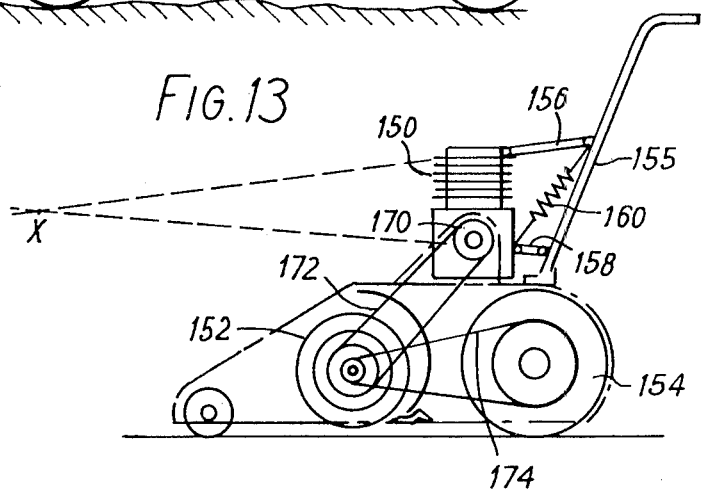
FIGS. 13 and 14 illustrate the application of the invention to a piston-engined lawnmower.
Figure 14:
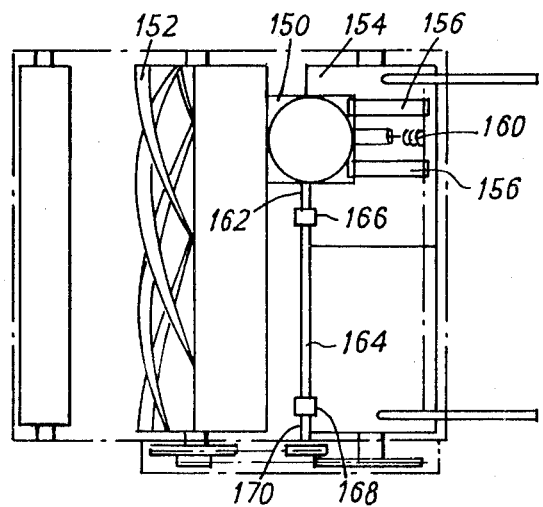

FIGS. 13 and 14 illustrate a lawn mower according to the invention, a single-cylinder spark ignition engine 150 powering cutter cylinder 152 and rear roller 154. Similarly to examples already described, such as FIG. 2, the engine is mounted on the main frame 155 through pivot links 156, 158 extending along axes that converge towards the region of the nodal axis. The links are provided in parallel pairs. Spring 160 supports the weight of the engine. The engine has an output shaft 162 and a cardan shaft 164 has one universal coupling 166 connecting with the shaft 162 and the other universal coupling 168 connecting with a sprocket wheel shaft 170 mounted on the mower main frame. The drive is then transmitted by drive chain 172 to the cutter cylinder 152 and drive chain 174 to rear roller 154. The orientation of the drive chains 172, 174 is not affected by the linear cyclic exciting force of the engine on its pivot links because the chain sprockets are journalled in the mower main frame.

Figure 15:
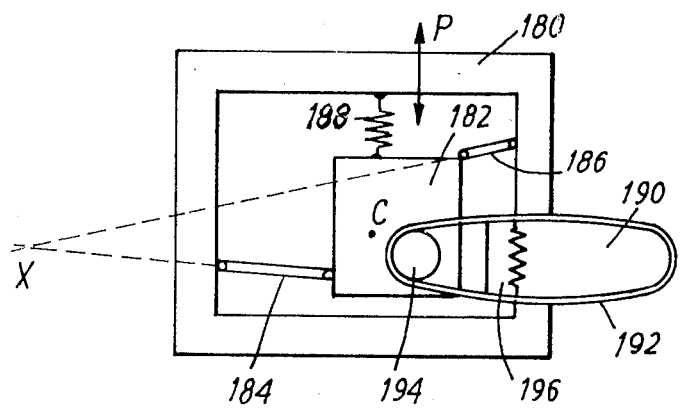
FIGS. 15 to 17 illustrate the application of the invention to a piston-engined chain saw.

The invention may also be applied to hand-held apparatus such as a chain saw to reduce the vibration experienced by the operator. FIG. 15 illustrates such apparatus schematically, comprising a support or carrier frame 180, and a piston engine or motor 182 attached to the frame by constraining elements in the form of pivot links 184, 186 and a suspension or centralising spring 188 the arrangement of these being as already described in principle. Mounted on the frame is a saw chain blade or guide 190, around which the saw chain 192 itself extends to be driven by a sprocket 194 on the engine output shaft. A felling dog 196 is secured to the frame 180 in known manner.

Figure 16:
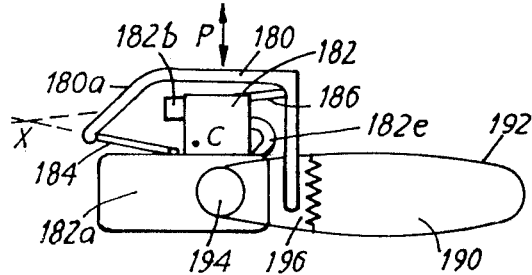
Figure 17:
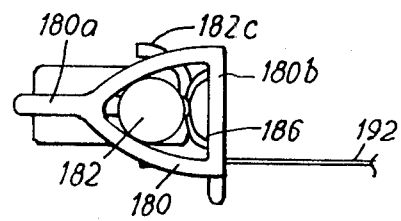

These same elements are shown in more detail in FIGS. 16 and 17. The engine is spark ignition engine constructed as a unit with its fuel tank 182a, induction pipe 182b and exhaust pipe 182c. The frame has hand grips 180a, 180b. The link 186 is conveniently in the form of a U-shaped link connected to each side of the hand grip 180b. The spring 188 is conveniently incorporated as one or more torsion bars of the form shown in FIG. 8.

Figure 18:
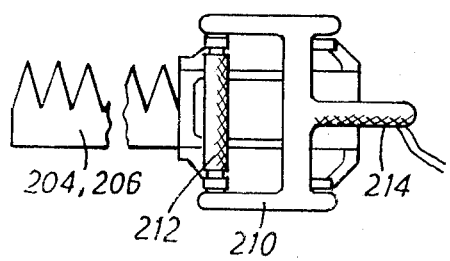
FIGS. 18 and 19 illustrate the application of the invention to a powered hedge-cutter.
Figure 19:
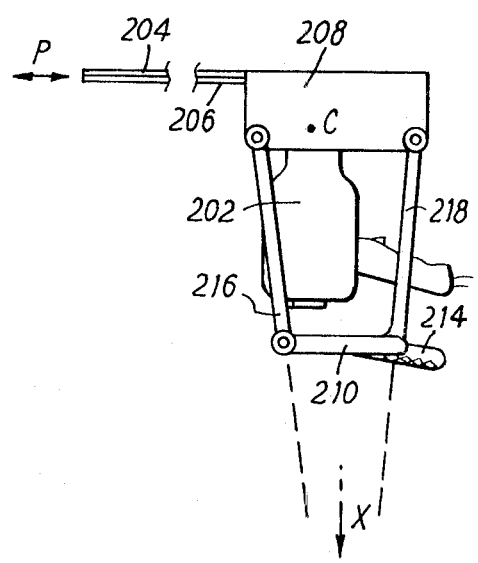

A further example of the invention is illustrated in FIGS. 18 and 19 in the form of a hedge-cutting tool. The power source now is a rotary electric motor in the form of a conventional rotary electric hand power tool 202, driving a reciprocating cutter blade 204 and the apparatus is so arranged as to reduce the transmission of vibration to the user. The driven blade 204 co-operated with a second blade 206 rigidly secured to the power tool 202 through a gear-box 208 converting rotary to reciprocating motion. In this embodiment of the present invention, the power tool and gearbox are mounted as a unit on support or carrier means 210 that has hand grips 212, 214. The unit 202, 208 is attached to the carrier means 210 by convergent pivot links 216,218 that act in the manner already described to define a pivot axis adjacent the true nodal axis for the ACLEF generated by the reciprocation of the blades 204, 206. The blade 206 is biased to a central position by a resilient element at one or more of the link pivots, e.g. in the manner of the torsion tube already described. Rubber buffers and dampers may be provided, as in all the embodiments already described, to limit the maximum oscillation amplitude.

In the operation of the hedge cutter, the electric motor drive operates to reciprocate the driven blade 204 and the effect of friction between the blades and the combined inertia of the rigid sub-assembly of the blade 206 and the unit 202, 208, imparts to this sub-assembly a counter-reciprocation. As a result, although the relative movement between the blades is virtually unchanged, the actual stroke of the driven blade is slightly reduced, while the support or carrier means 210 is substantially isolated from the oscillatory motion of both the drive blade 204 and the sub-assembly 202, 206, 208.

It is to be understood that the mechanisms described above are intended simply as examples and the invention may be applied to wholly or partially isolating the vibrations of many other forms of mechanism that comprise one or more cyclically displaceable elements that produce an ACLEF.

Similarly, many other forms of suspension than those in the examples described above can be employed to provide the required freedom of movement about the nodal axis or an axis parallel thereto and sufficiently close to the nodal axis to give a useful degree of reduction of the vibration transmitted from the mechanism.

What is claimed is:

1. Apparatus comprising a motive power unit having an internal combustion piston engine of either the single cylinder or the two-cylinger in-line type, and a variable speed transmission gearbox, the engine having a crankshaft rotatable at a fundamental or first order frequency and a reciprocating piston in the or each cylinder of the engine mechanically connected to said crankshaft, the displacements of said piston or pistons producing an aggregate cyclic linear force of fundamental frequency and harmonics thereof acting on the same line, rotary balancing means co-operating with said crankshaft for balancing at least the major part of any rotating force of said fundamental frequency produced by said crankshaft, the power unit having a centre of mass spaced from the line on which said aggregate cyclic linear force acts and there being a nodal axis about which said aggregate force thereby tends to rotate the mechanism in operation, said nodal axis being disposed at a distance from said unit, support means for the power unit and a plurality of pivot links attaching said power unit to said support means, said plurality of links constraining movement of the power unit relative to the support means substantially to arcuate pivoting about an axis in the region of said nodal axis thereby preventing all degrees of freedom of movement of the power unit relative to said support means except for pivoting of the power unit under the sole influence of the aggregate cyclic linear exciting force produced by said piston or pistons in order to at least substantially reduce the transmission of said aggregate cyclic linear exciting force to said support means.

2. Apparatus according to claim 1 wherein the lengths of the individual pivot links are each at least twenty times the half-amplitude of oscillation of the power unit in operation.

3. Apparatus according to claim 2 wherein a transmission member is mounted on the support means and means are provided for the transmission of power between the transmission member and the gearbox, said transmission means being so arranged that the forces transmitted therethrough produce substantially no torque component about the nodal axis.

4. Apparatus according to claim 3 wherein said transmission means are arranged to transmit said power as a force acting along an axis that extends at least adjacent to the nodal axis.

5. Apparatus according to claim 4 wherein the transmission means comprise a drive transmission chain connected to said mechanism having a chain run placed under tension to transmit said drive, said tensioned run of the chain lying on a line extending close to the nodal axis.

6. Apparatus according to claim 3 wherein said power transmission means are arranged to transmit the power as a torque acting about an axis that is in a plane normal to the nodal axis.

7. Apparatus according to claim 6 wherein the transmission means comprise a rotary drive shaft connected to said mechanism and transmitting a torque with the rotation of said at least one rotary element of the mechanism, the shaft axis lying in a plane substantially perpendicular to the nodal axis.

8. Apparatus according to claim 1 further comprising resilient means connected between the power unit and the support means to support at least a part of the weight of the power unit.

9. Apparatus according to claim 8, wherein and a fluid conduit connecting with the cylinder or cylinders of said engine provides said resilient means.

10. Apparatus according to claim 1 further comprising damping means substantially independent of velocity connected between the power unit and the support means.

11. A chain saw comprising a support frame, a reciprocating piston engine mounted on said frame, a saw chain driven by said engine and saw chain guide means secured to said frame guiding said chain saw, said engine having a casing and rotary means mounted therein including at least one crankshaft arranged to rotate at a fundamental or first order frequency and rotary balancing means cooperating with said means for balancing at least the major part of any rotating force of said fundamental frequency produced by said rotary means, said engine further having cyclically displaceable means comprising at least one piston mechanically connected to said crankshaft, the displacements of said cyclically displaceable means producing a linear cyclic force of fundamental frequency and harmonics thereof acting on the same line in the direction of reciprocation of said piston, a plurality of pivot links attaching the engine to the frame, said plurality of pivot links preventing all degrees of freedom of movement of the engine relative to the frame except for movement of the engine under the sole influence of the aggregate cyclic linear exciting force produced by said cyclically displaceable means of the engine, whereby the transmission of said aggregate cyclic linear exciting force to said frame is at least substantially reduced, a rotary output member mounted on said casing and driven by said crankshaft being connected directly to the saw chain, said chain having a tensioned length leading to said output member that extends substantially perpendicular to the line of action of said aggregate force.

12. Apparatus comprising a mechanism having at least one element arranged to rotate at a fundamental or first order frequency and at least one cyclically displaceable further element mechanically connected to said at least one element, the displacement of said at least one cyclically displaceable element producing a linear cyclic force of fundamental frequency and harmonics thereof acting on the same line, the mechanism having a center of mass that is close to but that is spaced from said line of action, the mechanism further comprising rotary balancing means co-operating with said at least one rotatable element for balancing at least the major part of any rotating force of said fundamental frequency produced by said at least one rotatable element, support means for the mechanism, attachment means attaching said mechanism to said support means, a power transmission member on said support means and means between said member and said mechanism for transmitting power therebetween, said attachment means comprising constraining elements that limit movement of the mechanism relative to the support means to pivoting about an axis at or adjacent a nodal axis about which the mechanism will tend to rotate in operation under the action of said aggregate linear exciting force produced by said at least one cyclically displaceable element, whereby the transmission of said aggregate cyclic linear exciting force to said support means is at least substantially reduced, said power transmission means between the mechanism and the power transmission member being so disposed that the forces transmitted therethrough produce substantially no torque component about the nodal axis.

13. Apparatus according to the claim 12, wherein the mechanism is a crankshaft and reciprocating piston mechanism selected from the group consisting of a single cylinder arrangement and a two-cylinder in-line arrangement, the said nodal axis being spaced from the plane containing the axis of rotation of the crankshaft and the cylinder axis or axes and parallel to said crankshaft axis.

14. A two cylinder in-line internal combustion engine having
  (i) reciprocating masses comprising respective pistons reciprocating in the cylinders on spaced parallel axes and a crankshaft to which said reciprocating masses are connected to rotate at a fundamental or first order frequency,
  (ii) the movement of the reciprocating masses with the rotation of the crankshaft producing a linear cyclic force of fundamental frequency and harmonics thereof acting on a common line spaced from the axes of reciprocation of the pistons,
  (iii) the engine having a centre of gravity that is spaced from said cyclic force common line and disposed in a plane perpendicular to the axis of rotation that is spaced from a parallel plane containing said common line,
  (iv) there being a nodal axis about which said aggregate cyclic force tends to rotate the engine in operation, said axis extending perpendicular to a plane containing the centre of mass of the engine and the line of action of said cyclic force having a common intersection in said plane with a line through the centre of mass and perpendicular to said common line of action of the cyclic force and thereby being directed obliquely to the axis of rotation of the crankshaft,
  (v) support means for connecting the engine to the support means, said pivot links constraining the freedom of movement of the engine relative the support means to an arc,
  (vi) said arc having a central axis disposed at or adjacent the nodal axis for said arcuate movement to be generated under the sole influence of the aggregate cyclic linear exciting force produced by the reciprocating masses, whereby the transmission of said aggregate force to the support means is at least substantially reduced.

* * * * *